Patented Feb. 12, 1946

2,394,691

UNITED STATES PATENT OFFICE 2,394,691

DESTRUCTIVE HYDROGENATION OF POLYCYCLIC HYDROCARBONS

Vladimir N. Ipatieff and Herman Pines, Riverside, Ill., assignors to Universal Oil Products Company, Chicago, Ill., a corporation of Delaware No Drawing. Application April 17, 1944, Serial No. 531,496

6 Claims. (Cl. 260—666)

This invention relates to the conversion of polycyclic hydrocarbons and more particularly to the destructive hydrogenation of bicyclic hydrocarbons containing one six and one four carbon atom rings per molecule to form monocyclic hydrocarbons.

In a broad aspect the present invention comprises the destructive hydrogenation of a bicyclic hydrocarbon containing one six and one four carbon atom rings per molecule in the presence of hydrogen and a hydrogenating catalyst.

In a more specific embodiment the invention relates to a process for preparing 1,1,2,3-tetramethylcyclohexane, which comprises subjecting a bicyclic hydrocarbon selected from the group consisting of pinane and pinene to destructive hydrogenation in the presence of hydrogen and a hydrogenating catalyst at a temperature within the range of about 125 to about 350° C.

In accordance with the invention. pinane is subjected to destructive hydrogenation in the presence of hydrogen and a suitable catalyst at a temperature and pressure adequate to form 1,1,2,3-tetramethylcyclohexane. Although any suitable hydrogenating catalyst may be used within the scope of the invention. the preferred catalyst comprises reduced nickel, which may or may not be composited with a suitable carrying material such as kieselguhr. With the nickel catalyst, the temperature employed is usually within the range of about 125 to about 350° C. and preferably about 160 to about 200° C. Satisfactory results have been obtained with 100 atmospheres of initial hydrogen pressure. although it is understood that lower or higher hydrogen pressures may be employed.

Other suitable catalysts which may be employed but not necessarily under the same conditions of operation and not necessarily with equivalent results may comprise. for example, the metals or oxides of iron. cobalt, platinum or palladium, the oxides or sulfides of chromium, molybdenum, tungsten or vanadium, mixtures of oxygen and nickel, or mixtures of the above catalysts.

Although pinene may be subjected to conversion under substantially the same conditions of treatment as hereinbefore set forth for the conversion of pinane, it usually is preferred to employ a two stage treatment in which the pinene is subjected to non-destructive hydrogenation at lower temperatures in a first stage to form pinane, and then to convert the pinane in a second stage at higher temperatures.

It is understood that the exact temperature and pressure to be employed will depend upon the particular charging stock, the kind and activity of the catalyst and probably upon the particular type of process employed.

The destructive hydrogenation may be effected in any suitable well known manner. Since no novelty is claimed herein for any particular method of contacting the reactants with the catalyst, there appears to be no need for a detailed description thereof in the present specification.

Under the conditions of treatment as hereinbefore set forth, the product of the destructive hydrogenation of pinane or pinene will distill at a temperature of 168 to 170° C. and, by analytical methods to be hereinafter recited will comprise 1,1,2,3-tetramethylcyclohexane.

The following example illustrates one specific operation of the process for converting pinane.

Pinane was subjected to destructive hydrogenation at a temperature of 180° C. in the presence of a nickel-kieselguhr catalyst and 100 atmospheres of initial hydrogen pressure. The hydrogenation proceeded to completion, one mol of hydrogen being absorbed per mol of pinane charged. The hydrogenated product distilled at 168–170° C. and had an index of refraction of 1.4575. This product contained 1,1,2,3-tetramethylcyclohexane and the structure of this compound was proved by subjecting a portion of the hydrogenated product to dehydrogenation to produce the alkyl aromatic compound and then nitrating. Further proof was found by brominating another portion of the dehydrogenated product.

Since the hydrogenated product contained a minor proportion of 1-methyl-4-isopropylcyclohexane, the hydrogenated product was the first subjected to dehydrogenation in the presence of platinized alumina at 230° C. Under these conditions 1-methyl-4-isopropylcyclohexane underwent dehydrogenation to form p-cymene, while the 1,1,2,3-tetramethylcyclohexane remained unchanged. The p-cymene was removed by means of fuming sulfuric acid, and the purified 1,1,2,3-tetramethylcyclohexane was then dehydrogenated in the presence of platinized alumina at 300–310° C. 40% of the 1,1,2,3-tetramethylcyclohexane was dehydrogenated per pass to form 1,2,3-trimethyl benzene and a gas fraction consisting of about 70% of hydrogen and 30% of methane. It is to be noted that, in this particular case, demethylation occurred during dehydrogenation of 1,1,2,3-trimethylcyclohexane so that the final product was 1,2,3-trimethyl benzene, identified by means of its bromo- and nitro-derivatives.

We claim as our invention:

1. A process for preparing a tetraalkyl cyclohexane hydrocarbon, which comprises subjecting a bicyclic hydrocarbon containing one six carbon atom ring per molecule and one four carbon atom ring per molecule to destructive hydrogenation and recovering said tetraalkyl cyclohexane from the resultant reaction products.

2. A process for preparing 1,1,2,3-tetramethylcyclohexane, which comprises reacting a bicyclic hydrocarbon selected from the group consisting of pinane and pinene with hydrogen under destructive hydrogenation conditions such that a carbon-to-carbon bond common to each carbocyclic ring in said hydrocarbon is ruptured and saturated, and recovering 1,1,2,3-tetramethylcyclohexane from the resultant reaction products.

3. A process for preparing 1,1,2,3-tetramethylcyclohexane, which comprises subjecting a bicyclic hydrocarbon selected from the group consisting of pinane and pinene to destructive hydrogenation in the presence of hydrogen and a hydrogenating catalyst at a temperature within the range of about 125 to about 350° C., and recovering 1,1,2,3-tetramethylcyclohexane from the resultant products.

4. A process for preparing 1,1,2,3-tetramethylcyclohexane, which comprises subjecting a bicyclic hydrocarbon selected from the group consisting of pinane and pinene to destructive hydrogenation in the presence of hydrogen and a nickel hydrogenating catalyst, and recovering 1,1,2,3-tetramethylcyclohexane from the resultant products.

5. A process for preparing 1,1,2,3-tetramethylcyclohexane, which comprises subjecting a bicyclic hydrocarbon selected from the group consisting of pinane and pinene to destructive hydrogenation in the presence of hydrogen and a nickel hydrogenating catalyst at a temperature of about 125 to about 350° C., and recovering 1,1,2,3-tetramethylcyclohexane from the resultant products.

6. A process for preparing 1,1,2,3-tetramethylcyclohexane, which comprises subjecting a bicyclic hydrocarbon selected from the group consisting of pinane and pinene to destructive hydrogenation in the presence of hydrogen and a nickel hydrogenating catalyst at a temperature of about 160 to about 200° C. and recovering 1,1,2,3-tetramethylcyclohexane from the resultant products.

VLADIMIR N. IPATIEFF.
HERMAN PINES.